Patented Aug. 23, 1938

2,128,175

UNITED STATES PATENT OFFICE 2,128,175

FUMIGATION

John M. Baer, Chicago, Ill., assignor to The Guardite Corporation, a corporation of Illinois No Drawing. Application February 19, 1937, Serial No. 126,705

6 Claims. (Cl. 99—216)

This invention relates to fumigation and more particularly to fumigation of products containing insects, insect larvae and eggs.

As described in Merriam and Wiles Patent No. 2,080,179, issued May 11, 1937, the boiling of water may be used to clear the interstices of a product of air, and when followed by introduction of fumigant at higher pressure, permits complete permeation of the product by the fumigant.

It has now been discovered that by using this procedure, insects, insect larvae and eggs of insects may be killed with steam at temperatures which heretofore had no appreciable deleterious effect upon them. This is particularly valuable in the case of materials such as grain, fruits and similar articles where the starch or gluten may be damaged by higher temperatures, or where enzymes may be destroyed or adversely affected.

As an example of the process, wheat was introduced into a closed container at a temperature of about 79° F. The container was then evacuated and the evacuation was continued for thirty minutes, at the end of which time the wheat had a temperature of 61° and the absolute pressure was about .32 inch. Steam was then introduced to raise the temperature of the wheat to 122° F. and the temperature was kept at this point by four additions of steam for thirty minutes. The pressure in the container at this point was approximately 3.54 inches.

The wheat, which originally had a moisture content of 9.2%, had been mixed with enough external surface water to bring its value to 14.2%, and after the steaming operation had a thoroughly permeated moisture content of 14.5%.

As another example of the process, test barrels of wheat were placed in a vacuum chamber with screened salve boxes containing insects and glass tubes carrying flour beetle eggs buried at a depth of eighteen inches in the middle of the barrels. Other boxes and tubes were placed on the surface of the grain. The vacuum pumps (steam ejectors) were started and run for sixty minutes. At the end of thirty minutes an absolute pressure of .20 inch was obtained, and at the end of an hour the absolute pressure was .15 inch. At that time, the temperature of the grain had been reduced from 85° F. to 53° F.

Steam was then introduced to raise the temperature into the required range of 100 to 130° F. and maintain it at that point a sufficient period to destroy the insect infestations.

The time required for killing varies with the temperature. At 120° F., following evacuation, the insects, larvae and eggs are killed almost instantaneously. At 110° F., a time of about five minutes is required and at 100° F. about 20 minutes is required. Somewhat lower temperatures than 100° F. may be employed but below this temperature the time requirements increase very rapidly.

Temperatures above 120° F. may be employed where they will not damage the material treated, but are not necessary for any ordinary purpose.

This process makes it possible to disinfect articles with steam at a cost far below any disinfecting operation heretofore possible. The cost of the steam is negligible and no other fumigating gas is required.

This application is a continuation-in-part of my co-pending application, Serial No. 110,405, filed November 11, 1936.

I claim:

1. The method of accelerating the fumigation of an insect-infested product in bulk, which consists essentially of removing substantially all non-condensible gas from the product and then treating the insect-infested product with steam to produce a temperature of not more than approximately 100 to 130° F. and maintaining the temperature at this range from approximately 20 to 0 minutes, the higher temperature corresponding to the lower time, whereby the product is substantially freed from insect infestations.

2. The method as set forth in claim 1 in which the product is freed from non-condensible gas by subjection to a high enough vacuum to cause boiling of contained moisture at the prevailing temperature and continuing the boiling and evacuation until substantially all condensible gas has been washed out by the water vapor.

3. The method as set forth in claim 1 in which the product is a fruit.

4. The method as set forth in claim 1 in which the product is a grain.

5. The method as set forth in claim 1 in which the product is a starchy product.

6. The method of accelerating the fumigation of an insect-infested product in bulk, which consists essentially of removing substantially all non-condensible gas from the product and then treating the insect-infested product with steam to produce a temperature of approximately 100° F., and maintaining the temperature at this range for approximately 20 minutes, whereby the product is substantially freed from insect infestations.

JOHN M. BAER.